United States Patent
Mathis et al.

(10) Patent No.: US 6,697,349 B2
(45) Date of Patent: Feb. 24, 2004

(54) SYSTEM AND METHODS FOR DISTRIBUTED CONNECTION AND MOBILITY PROCESSING IN A MULTICAST IP NETWORK INCORPORATING MULTI-CELL LOCATION AREAS

(75) Inventors: James E. Mathis, Barrington, IL (US); Mark L. Shaughnessy, Phoenix, AZ (US); Surender Kumar, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 148 days.

(21) Appl. No.: 09/945,459

(22) Filed: Aug. 30, 2001

(65) Prior Publication Data

US 2003/0043772 A1 Mar. 6, 2003

(51) Int. Cl.[7] .................. H04Q 7/24; H04L 12/28; H04J 3/26
(52) U.S. Cl. ............. 370/338; 370/390; 370/432; 370/331; 455/518; 455/524
(58) Field of Search ................. 370/331, 338, 370/390, 432, 441, 524, 526, 401, 352, 360, 465; 455/518, 524, 560, 561, 426, 432, 438

(56) References Cited

U.S. PATENT DOCUMENTS

| | | | |
|---|---|---|---|
| 5,361,256 A | | 11/1994 | Doeringer et al. |
| 5,387,905 A | | 2/1995 | Grube et al. |
| 5,511,168 A | | 4/1996 | Perlman et al. |
| 5,517,494 A | | 5/1996 | Green |
| 5,541,927 A | | 7/1996 | Kristol et al. |
| 5,689,810 A | * | 11/1997 | Shaughnessy et al. ...... 455/453 |
| 5,831,975 A | | 11/1998 | Chen et al. |
| 6,011,782 A | * | 1/2000 | DeSimone et al. ......... 370/260 |
| 6,138,025 A | * | 10/2000 | Lee et al. .................... 455/453 |
| 6,138,144 A | | 10/2000 | DeSimone et al. |
| 6,141,347 A | * | 10/2000 | Shaughnessy et al. ...... 370/390 |
| 6,181,697 B1 | * | 1/2001 | Nurenberg et al. ......... 370/390 |
| 6,188,911 B1 | * | 2/2001 | Wallentin et al. ........... 455/524 |
| 6,252,862 B1 | * | 6/2001 | Sauer et al. ................ 370/331 |
| 6,253,242 B1 | | 6/2001 | Rosenberg |
| 6,259,701 B1 | | 7/2001 | Shur et al. |
| 6,292,667 B1 | * | 9/2001 | Wallentin et al. ........... 455/458 |
| 6,298,058 B1 | * | 10/2001 | Maher et al. ............... 370/390 |
| 6,370,142 B1 | * | 4/2002 | Pitcher et al. .............. 370/390 |
| 6,424,638 B1 | * | 7/2002 | Ray et al. ................... 370/331 |
| 6,434,396 B1 | * | 8/2002 | Rune ........................... 455/502 |
| 6,477,149 B1 | * | 11/2002 | Okanoue .................... 370/312 |

* cited by examiner

Primary Examiner—Steven H. D Nguyen
Assistant Examiner—M. Phan
(74) Attorney, Agent, or Firm—Steven R. Santema; Terri S. Hughes (57) ABSTRACT

A wireless communication system 200 comprises a connectionless packet network 201 coupled to a plurality of sites 203–208 that are in location areas 260, 261. The sites join respective location area multicast addresses to receive messages from other sites in their location area. Communication units desiring to participate in talkgroup calls need only to register affiliation with a first site of the location area. Upon the first site receiving an affiliation message, it joins a payload multicast group address to receive payload for the talkgroup. In alternative embodiments, the first site sends, via the location area multicast address, either control message(s) or tunneled payload associated with the talkgroup call to secondary site(s) of the location area. The sites initiate paging sequences to determine whether communication units at their sites desire to participate in the call and, based on the responses, the sites may deliver stored payload and/or join the payload multicast group address to receive payload for the call. In this manner, a centralized entity such as a VLR is not needed to keep track of communication units in the location area.

16 Claims, 4 Drawing Sheets

— PRIOR ART —

SYSTEM AND METHODS FOR DISTRIBUTED CONNECTION AND MOBILITY PROCESSING IN A MULTICAST IP NETWORK INCORPORATING MULTI-CELL LOCATION AREAS

CROSS-REFERENCE TO RELATED APPLICATIONS

This invention is related to U.S. patent application Ser. No. 09/283,121, filed Mar. 31, 1999, titled "Wireless Communication System Incorporating Multicast Addressing and Method for Use," which application issued Oct. 31, 2000 as U.S. Pat. No. 6,141,347.

FIELD OF THE INVENTION

This invention relates generally to wireless communication systems and, more particularly, to IP multicast communication systems incorporating location areas.

BACKGROUND OF THE INVENTION

Figure 1:
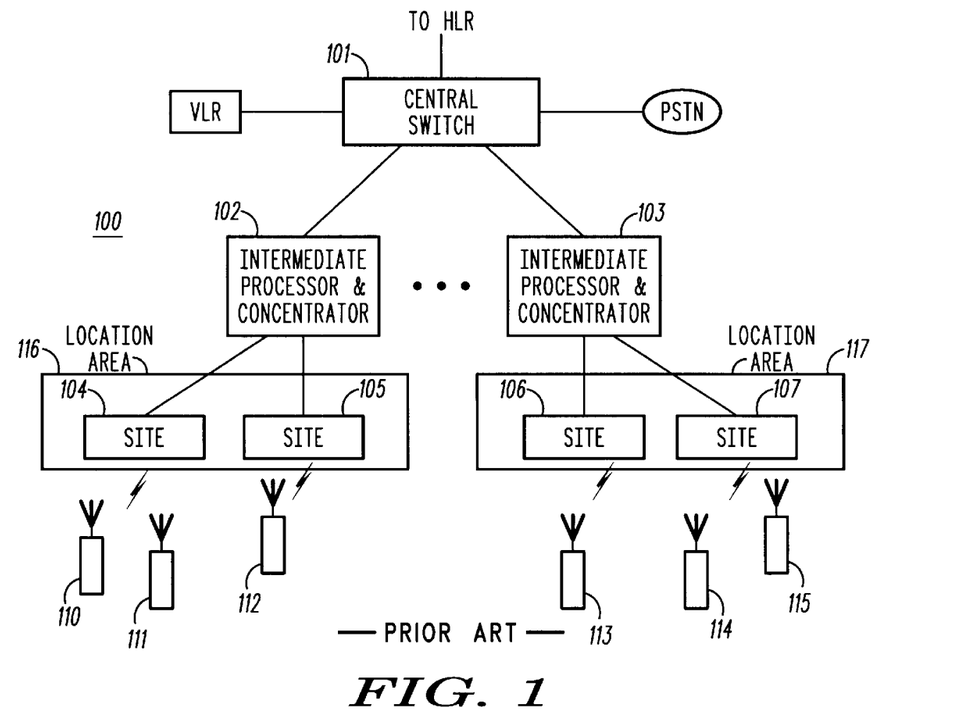
FIG. 1 is a block diagram of a prior art wireless communication system.

Today's wireless communication systems provide a broad range of services to both individual communication units and groups of communication units while they move about. These services include cellular telephony, group dispatch, and packet data, to name just a few. A typical example of such a system 100 is illustrated in FIG. 1. The configuration shown in FIG. 1 is typical in wireless communications systems such as Global System for Mobile Communications (GSM), Advanced Mobile Phone Service (AMPS), Terrestrial Trunked Radio (TETRA), "IDEN", and "SMART-ZONE" systems. As shown, a central switch 101 provides connections between cell sites 104–107.

A plurality of communication units 110–115 (e.g., mobile or portable radios, cellular telephones, personal digital assistants (PDAs)) wirelessly communicate with the sites 104–107 and each other, and are often logically divided into various subgroups or talk groups. In such a system, the call processing management and switching functionality are generally contained within the same physical unit, i.e., the central switch 101. The sites 104–107 are connected to the central switch 101 through dedicated or on-demand links and intermediate processors 102–103 in what is often called a "star" configuration. Some very large systems use a hierarchy of such "stars" where intervening concentrators group the links from multiple cell sites and do some lower level processing on them before passing them up to the central switch.

Oftentimes, particularly in cellular systems, the cell sites are grouped within different multi-cell "location areas." As shown, cell sites 104, 105 are within location area 116 and cell sites 106, 107 are within location area 117. Alternatively or additionally, communication systems may include certain individual sites that are not grouped with other sites. This is typically the case for private trunking systems. For convenience, these individual sites will be referred to as single-cell "location areas."

Heretofore, wireless communication networks as described above typically used a centralized mobility management function. In such systems, as communication units move from one location area to another (or, in trunking systems, from one cell site to another) they indicate their movement to the network through handover and location update procedures. The location change information is forwarded to a hierarchical network of location databases, usually called visitor location registers (VLRs) and home location registers (HLRs). The centralized connection management functionality in the switching hub uses this location information to determine which cell sites need to be included when a call request is made. In the instance where communication units move among cells within a location area (i.e., without crossing location area boundaries), the communication units do not automatically update their location to the infrastructure. This is done to save control channel capacity at the expense of requiring a paging sequence at the start of calls. The VLR is relied upon to keep track of which location area each communication unit is located in so that cells in the right location areas can be paged when needed for a call.

Next-generation wireless systems propose to employ multicast addressing protocols, such as multicast Internet Protocol (IP) for providing group or dispatch call services. Multicast IP may also be used for traditional cellular systems supporting interconnect/individual calls. Examples of IP Multicast communication systems include the referenced U.S. patent application Ser. No. 09/283,121, now issued as U.S. Pat. No. 6,141,347; and U.S. patent application Ser. No. 09/464,269, titled "Methods for Implementing a Talkgroup Call in a Multicast IP Network," each of which is assigned to Motorola, Inc. and incorporated herein by reference in its entirety.

Generally, IP multicasting protocols are considered to be more efficient and less costly than traditional circuit-switched networks. The multicast IP network defines a distributed, rather than centralized, connection and mobility processing environment where there is no centralized location register (VLR/HLR). Rather, mobility information is inherent to the packet network as communication units register or de-register individual or group affiliations with cells, and the cells join or leave multicast IP addresses to participate in traffic for the communication units. The benefits of a distributed connection and mobility processing environment include fully localized resource management, fully distributed mobility management and easy network scalability.

While distributed connection and mobility processing networks such as multicast IP networks offer several advantages relative to traditional circuit-switched networks, they do not presently support the concept of multi-cell location areas. That is, communication units in a multicast IP network are presently required to register affiliations each time they enter a new cell. It would be desirable to provide multi-cell location areas in multicast IP networks, analogous to those described in circuit-switched systems, whereupon communication units initially registered in a cell of a location area may roam to other cells within the location area without registering affiliations with each new cell.

Therefore, a need exists for a system and methods of distributed connection and mobility processing for multi-cell location areas. Preferably, the system and methods would enable a communication unit to register affiliations and/or location updates only upon entering a new location area to save control channel capacity. Advantageously, a paging sequence would be initiated at the start of calls without relying on a centralized entity such as a VLR to keep track of which communication units should be paged. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

Figure 2:
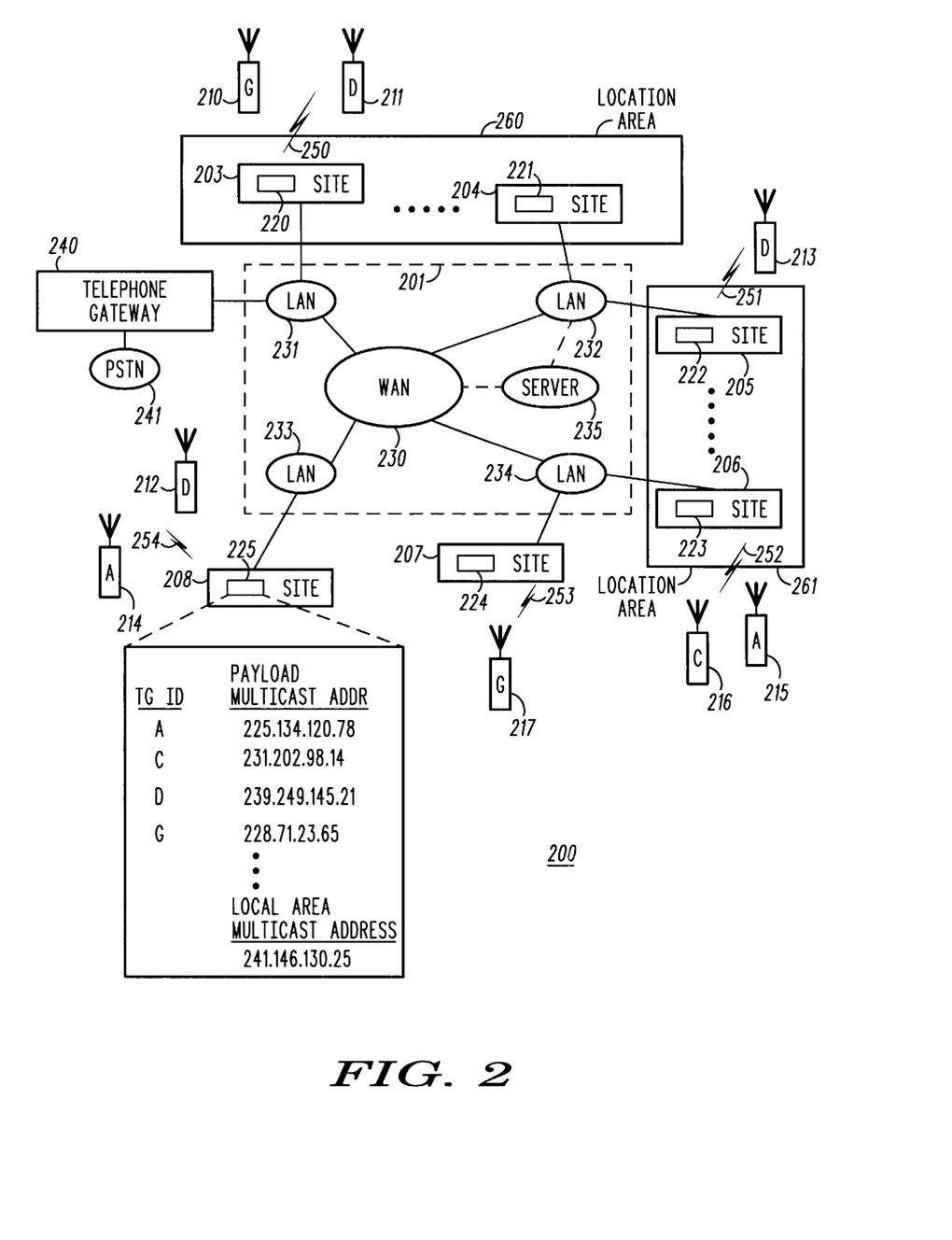
FIG. 2 is a block diagram of a wireless communication system in accordance with the present invention.

Turning now to FIG. 2, there is shown a wireless communication system 200 comprising a connectionless packet network 201 coupled to a plurality of sites 203–208, which sites are in communication, via wireless communication resources 250–254, with a plurality of communication units 210–217. Additionally, the connectionless packet network 201 is coupled to a public switched telephone network (PSTN) 241 via a telephone gateway 240. The sites 203, 204 are grouped within multi-cell location area 260 and sites 205, 206 are grouped within multi-cell location area 261. Sites 207, 208 comprise single-cell location area(s). The term "location area" shall be understood to comprise a geographical area including one or more sites and encompassing radio frequency (RF) coverage areas of the included sites. As will be appreciated, the communication system may include fewer or greater numbers of location areas 260, 261 and the various location areas may include different cell sites or fewer or greater cell sites.

In one embodiment, the sites 203–208 include respective controllers 220–225 operably linked to the connectionless packet network 201. Typically, the controllers 220–225 are physically located at the respective sites in one or more base stations (not shown) or in multicast router(s) (not shown). Alternatively, the controllers 220–225 may be located at a fixed equipment ("infrastructure") site. The controllers 220–225 manage operation of the sites 203–208 in accordance with well known techniques. The controllers 220–225 each comprise a processor (not shown), such as a microprocessor, microcontroller, digital signal processor or combination of such devices) coupled to a memory (not shown), such as volatile or non-volatile digital storage devices or combination of such devices. In one embodiment of the present invention, mappings of talk group identifications to multicast addresses are stored in the memory of the controllers 220–225.

The plurality of communication units 210–217 are logically arranged into a talk groups, which talk groups have corresponding talk group identifications, as known in the art. In FIG. 2, four separate talk groups are shown, identified by labels "A", "C", "D" and "G". Talk group "A" at least includes the communication units having reference numerals 214 and 215. Talk group "C" at least includes the communication unit having reference numeral 216. Talk group "D" at least includes the communication units having reference numerals 211–213. Finally, talk group "G" at least includes the communication units having reference numerals 210 and 217. As those having ordinary skill in the art will recognize, any number of talk groups having corresponding talk group identifications can be established within the system 200. Suitable wireless communication resources 250–254 are multiple RF (radio frequency) channels such as pairs of frequency carriers, time division multiplex (TDM) slots, code division multiplex (CDM) channels, or any other RF transmission mediums.

The connectionless packet network 201 comprises a wide area network (WAN) 230 coupled to one or more local area networks (LANs) 231–234. Suitable equipment for establishing the WAN 230 and LANs 231–234 are Cisco 2600 routers, 3640 routers, 7200 routers, 7500 routers, or 3Com "NetBuilder" series routers. The network 201 may also comprise at least one central server (sometimes known as a "zone controller") 235 coupled to either the WAN 230 or one of the LANs 231–234. The network 201 is connectionless in that any data sent across the network from one end point (e.g., a first site) to another (e.g., a second site) does not require a connection to be established between the two end points before the data can be sent. Examples of connectionless protocols that may be used to implement the present invention are Internet Protocol (IP) over Ethernet, or over Point to Point Protocol (PPP), as known in the art.

The connectionless packet network 201 supports at least one multicast address. In the context of the present invention, a multicast address, regardless of any underlying implementation, provides one-to-many or many-to-many communications capability within the network 201. Multipoint routes pertaining to multicast addresses used in the present invention are maintained by the routers forming the network, rather than by a centralized entity. A suitable technique for providing multicast addressing capabilities is through the use of Internet Protocol (IP) Multicast. IP Multicast is based on the well-known Internet Group Management Protocol (IGMP) which allows a multicast router to track the existence of multicast group members on local networks coupled to that router. Additionally, multicast routers use the information provided by IGMP in conjunction with a multicast routing protocol to support forwarding of data across a network of routers. Given the nature of wireless communication systems, sparse mode protocols such as the Core Based Tree (CBT) protocol and the Protocol Independent Multicast-Sparse Mode (PIM-SM) protocol are preferred multicast routing protocols for use in the present invention. However, it is anticipated that dense mode protocols such as the Distance Vector Multicast Routing Protocol (DVMRP), the Multicast Open Shortest Path First (MOSPF) protocol, and the Protocol Independent Multicast-Dense Mode (PIM-DM) protocol may also be used to implement the present invention. A common feature of these multicast routing protocols is that each establishes a "spanning tree" which, for a given multicast group, defines all of the router interfaces which contain group members and the necessary routes between these interfaces to provide the multicast distribution with a minimum amount of data replication.

In order to harness the mobility management provided by multicast addressing, multicast addresses are advantageously associated with talk group identifications. In one embodiment, the central server 235 dynamically assigns and manages respective payload and control IP multicast addresses for payload (voice, data, video, etc.) and control messages between and among participating talkgroup members at the various sites 203–208. That is, multicast group addresses for particular talkgroups are not fixed but rather are identified and assigned by the zone controller 116 on a call-by-call basis. As such, a particular multicast group address is only temporarily assigned to any one call and can be reassigned to different calls as needed or desired. Dynamic, rather than static assignment of addresses is advantageous in terms of efficient use of resources in the network. Alternatively, however, static assignment of addresses can also be done. As still another alternative, multicast addresses may be assigned for interconnect/individual (non-talkgroup calls).

In one embodiment, the controller of each site maintains mapping(s) of talk group identifications to corresponding multicast addresses and also stores a location area multicast address. For example, with reference to FIG. 2, controller 225 (site 208) stores a mapping of talk groups "A", "C", "D" and "G" to respective payload multicast group addresses 225.134.120.78, 231.202.98.14, 239.249.145.21 and 228.71.23.65 and also stores a location area multicast address 241.146.130.25. Similar mappings are also stored by the controllers 220–224 at sites 203–207. As will be appreciated, the mapping of talk group to any particular multicast address and/or the location area multicast address may be assigned dynamically or statically. Optionally, different ranges of permissible multicast addresses may be specified for the payload and location area multicast addresses (e.g., addresses beginning with 240+ may be designated for location area multicast addresses).

In one embodiment, the payload multicast addresses define multicast addresses to be used for payload traffic for respective talkgroups. The payload multicast addresses are obtained by a site when at least one communication unit affiliated with a given talk group affiliates with the site. For example, referring to FIG. 2, no communication units from any of the representative talk groups are currently affiliated with site 204. So long as this condition remains, payload multicast group addresses either have not yet been assigned (in the case where payload multicast addresses are assigned dynamically) or the payload multicast group addresses are stored but not accessed (in the case where payload multicast group addresses are statically assigned) at site 204. In contrast, site 208 currently has at least one affiliated communication unit from talk group "A" and at least one affiliated communication unit from talk group "D." Thus, site 208 may will have received or retrieved from memory payload multicast group addresses for talk groups "A" and "D." (Note that the same physical unit can have multiple talk group affiliations. Thus, a single communication unit could lead to multiple talk groups being affiliated with a given site.)

Alternatively, the payload multicast addresses define multicast addresses to be used for traditional cellular interconnect/individual calls. The payload multicast addresses are obtained by a site when at least one communication unit participating in the call affiliates with the site.

In the preferred embodiment, the location area multicast addresses define multicast addresses that are generally used for control traffic between sites of a location area. However, in one embodiment, as will be described in greater detail in relation to FIG. 4, the location area multicast addresses are also be used for tunneling payload from one site to another in a location area. The location area multicast addresses are unique to each location area and are joined by all cell controller(s) within the corresponding location area. In one embodiment, the location area multicast addresses are statically assigned to each location area and joined by the sites upon "power up" or initialization of the sites. Alternatively, the location area multicast addresses may be dynamically assigned, for example, upon a site of the location area first receiving an affiliation request for a talkgroup. The dynamic assignment of location area multicast addresses may be used to dynamically change the size and composition of location areas to respond to changes in number of subscriber units, call placement loads or otherwise optimize network performance, adjust call setup latencies, and minimize RF resources used for paging traffic.

Generally, the location area multicast addresses and algorithms making use of them enable communication units to register only with a first cell within a location area. That is, the communication units need not register affiliations and/or location updates each time they enter a new cell unless the new cell is in a new location area. In the case of a single-cell location area, a single location area multicast address is assigned to the cell. In the case of a multi-cell location area, a location area multicast address is shared by all controllers within the corresponding location area. The location area multicast addresses differ from the payload multicast group addresses assigned to the respective sites. For example, with reference to FIG. 2, the location area multicast address assigned to site 208 (a "single-cell location area") is 241.146.130.25. This address differs from the location area multicast address of any other location area and also differs from the payload multicast addresses stored at site 208. In similar fashion, site 207 will maintain its own unique location area multicast address. Sites 203, 204 (within location area 260) will share a common location area multicast address and similarly, sites 205, 206 (within location area 261) share a common location area multicast address.

Figure 3:
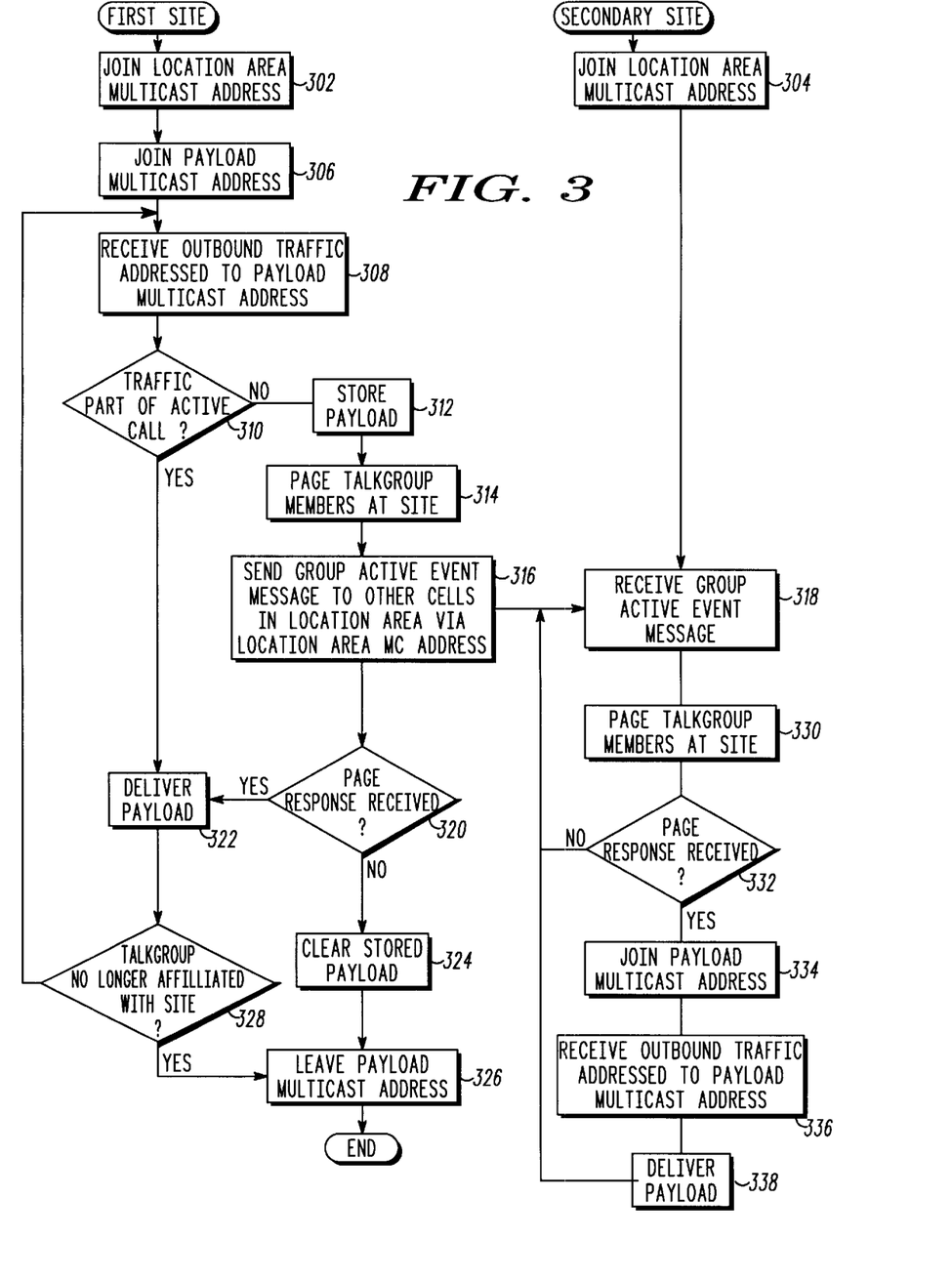
FIG. 3 is a flow chart illustrating operation of a site in accordance with one embodiment of the present invention.
Figure 4:
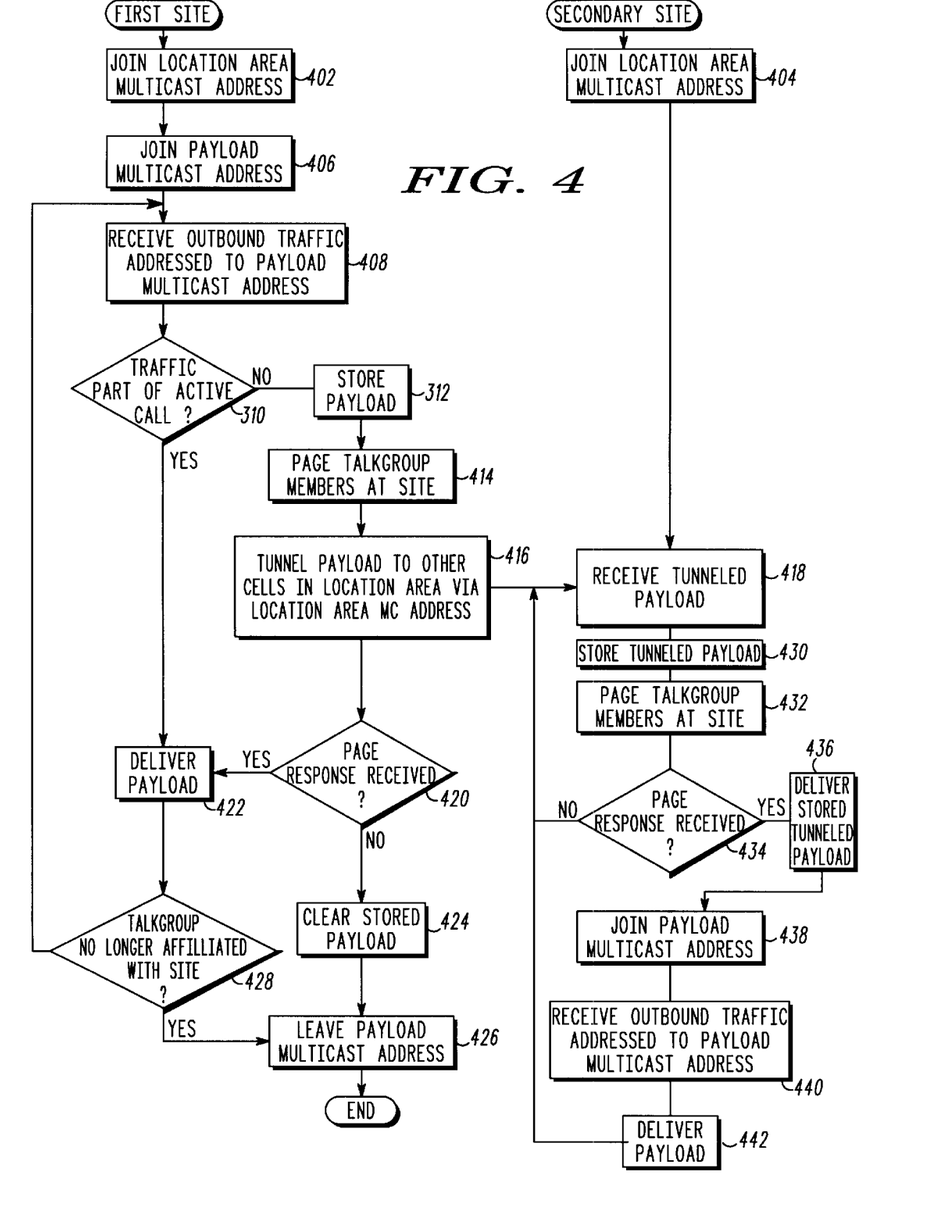
FIG. 4 is a flow chart illustrating operation of a site in accordance with another embodiment of the present invention.

FIG. 3 and FIG. 4 are flowcharts useful for describing operation of cell sites in a multi-cell location area according to two alternative embodiments of the invention. The steps of FIG. 3 and FIG. 4, where applicable, are implemented as software routines executed by a site controller, base stations or any other elements contributing to the operation of the cell sites. Both flowcharts presume that a communication unit has registered affiliation with a talkgroup at a first site of the location area and, while it remains affiliated with the talkgroup, the communication unit moves to one or more secondary sites of the location area. The communication unit does not register affiliation with the talkgroup at the secondary site(s). That is, as long as the communication unit remains within the location area, it can move from site to site without registering affiliations with each new site. Registration is required only if the communication unit roams to a new location area. For example, with reference to FIG. 2, if communication unit 213 has registered affiliation with talkgroup "D" at site 205 ("the first site"), it may move within location area 261 to site 206 ("a secondary site") without re-registering affiliation with talkgroup "D" or informing either site that it has changed locations.

Turning initially to FIG. 3, there will be described an embodiment where location area multicast addresses are used for control signaling (i.e., with no tunneling of payload) between the first site and secondary site(s). At step 302, 304 the first site and secondary sites (i.e., all of the sites in the location area) join the location area multicast address associated with the location area. As has been described, the location area multicast address may be statically or dynamically assigned.

After having received a registration request from a communication unit to participate in a talkgroup, the first site joins at step 306 a payload multicast address that is to be used for distributing payload for the talkgroup. As has been described, the payload multicast address may be statically or dynamically assigned. At step 308, the first site receives outbound (from the infrastructure to the communication units) traffic via the payload multicast address associated with the talkgroup. The traffic or "payload" may comprise, for example, audio (including but not limited to voice), video, data, multimedia, etc.

At step 310, the first site determines if the traffic is part of an active (already established) talkgroup call. As defined herein, a talkgroup call is active if a payload multicast group address has been identified and sent to one or more participating devices for the call, and the participating devices have joined the payload multicast group address to receive payload for the call. The participating devices may comprise, for example, repeater/base stations associated with certain sites, mobile or portable radio(s), wireline communication device(s), console(s) (wireless or wireline), call logger(s), CALEA gateway(s), telephone interconnect device(s) and/or internet protocol telephony device(s) affiliated with the talkgroup. If the traffic is part of an active call, the first site delivers the payload to the participating devices at step 322.

If the traffic is not part of an active call, the first site "buffers" or stores the payload in memory at step 312 for possible delayed delivery to participating devices at the first site or secondary site(s). As defined herein, a talkgroup call is not "active" if the received traffic is for a new call wherein participating devices have not yet been identified or have not yet joined the multicast address for the call, or where the call is for an expired context. An expired context occurs, for example, when the call has been idle (e.g., no traffic received) for a sufficient period of time to be declared inactive. At step 314, the first site sends a paging message to prospective talkgroup members at its site.

At step 316, the first site sends one or more "Group Active Event" messages to the secondary site(s) in its location area, thereby informing those sites that a particular talkgroup is active. In the preferred embodiment, the Group Active Event message(s) are addressed to the location area multicast address such that it may be received by other cells in the location area (e.g., the "secondary sites") having joined the location area multicast address. At step 318, the secondary site(s) receive the Group Active Event message(s).

At step 320, the first site determines if it has received responses to the page(s) sent at step 314. In one embodiment, coincident to step 314, the first site starts a page response timer, whereby page responses must be received within a designated time period to be considered valid. In such case, page responses received after the designated time period are considered invalid. If, at step 320, page responses are received in timely fashion (i.e., before expiration of the page response timer), the first site identifies the responding devices and delivers the stored payload to the responding devices at step 322. For example, in the case where the responding devices comprise wireless communication units, the first site delivers the stored payload to the communication units via appropriate wireless communication resources at step 322.

At step 328, the first site can determine by known methods that the talk group is no longer affiliated with the site. If that is the case, the first site leaves the payload multicast group address at step 326. Otherwise, so long as at least one communication unit affiliated with the talk group remains operational within the site, processing continues at steps 308–322 as described above.

If, at step 320, page responses are not received (or not received in timely fashion), the first site determines that there are no devices at its site that desire to receive payload for the talkgroup, flushes the buffer ("clears stored payload") at step 324 and leaves the payload multicast group address at step 326.

The secondary site(s), after having received the Group Active Event message at step 318, also perform a paging sequence at their respective sites to determine if there are devices at their site(s) that desire to receive payload for the talkgroup. At step 330, the secondary site(s) send paging messages to prospective talkgroup members at their sites. At step 332, the secondary site(s) determine whether page responses have been received. Like the paging sequence described in relation to the first site, the secondary site(s) may start a page response timer, whereby page responses must be received within a designated time period to be considered valid. If, at step 332, page responses are not received (or not received in timely fashion) at any secondary site, that site determines that there are no devices at its site that desire to receive payload for the talkgroup and the site returns to an idle state until such time as the site receives another Group Active Event message at step 318.

As will be appreciated, the secondary sites may receive multiple Group Active Event message(s) associated with a particular talkgroup call. In the preferred embodiment, to achieve efficient use of bandwidth, secondary site(s) perform the paging sequence of steps 330, 332 and join the payload multicast group address at step 334 only upon the first occurrence of receiving a Group Active Event message for a particular talkgroup. In such embodiment, if a secondary site receives any subsequent Group Active Event message(s) after a talkgroup is already active at the secondary site (marked active after the site has joined the payload multicast address), the secondary site will not re-accomplish steps 330, 332, 334 but rather will ignore the subsequent Group Active Event messages for the talkgroup.

Alternatively, if the use of paging bandwidth is not a concern, the paging sequence of steps 330, 332 may be repeated periodically responsive to single or multiple Group Active Event messages. This would decrease the likelihood of certain communication units losing calls because they did not receive a paging message for a call. This might occur, for example, if a mobile communication unit is in a tunnel during the paging sequence. By repeating the paging sequence, the mobile communication unit may emerge from the tunnel, receive and respond to subsequent paging messages and thereby participate in the call.

If, at step 332, a secondary site determines if it has received timely response(s) to the page(s) (hence there is at least one device at its site that desires to receive payload for the talkgroup), it joins at step 334 the payload multicast group address for the talkgroup. Thereafter, the secondary site is able to receive at step 336 outbound traffic (payload) addressed to the payload multicast address. The secondary site delivers the payload to the responding devices (e.g., communication units) via appropriate wireless communication resources at step 338. The process then returns to an idle state until such time as the site receives another Group Active Event message at step 318.

Turning now to FIG. 4, there will be described an alternative embodiment wherein location area multicast addresses are used both for control signaling and for tunneling payload between the first site and secondary site(s). The tunneling process of FIG. 4 minimizes lost user packets at the expense of increased network bandwidth utilization during the paging period. At step 402, 404 the first site and secondary sites (i.e., all of the sites in the location area) join the location area multicast address associated with the location area. As has been described, the location area multicast address may be statically or dynamically assigned.

After having received a registration request from a communication unit to participate in a talkgroup, the first site joins at step 406 a payload multicast address that is to be used for distributing payload for the talkgroup. As has been described, the payload multicast address may be statically or dynamically assigned. At step 408, the first site receives outbound (from the infrastructure to the communication units) traffic via the payload multicast address associated with the talkgroup. The traffic or "payload" may comprise, for example, audio (including but not limited to voice), video, data, multimedia, etc.

At step 410, the first site determines if the traffic is part of an active (already established) talkgroup call. As defined herein, a talkgroup call is active if a payload multicast group address has been identified and sent to one or more participating devices for the call, and the participating devices have joined the payload multicast group address to receive payload for the call. The participating devices may comprise, for example, repeater/base stations associated with certain sites, mobile or portable radio(s), wireline communication device (s), console(s) (wireless or wireline), call logger(s), CALEA gateway(s), telephone interconnect device(s) and/or internet protocol telephony device(s) affiliated with the talkgroup. If the traffic is part of an active call, the first site delivers the payload to the participating devices at step 422.

If the traffic is not part of an active call, the first site "buffers" or stores the payload in memory at step 412 for possible delayed delivery to participating devices at the first site or secondary site(s). As defined herein, a talkgroup call is not "active" if the received traffic is for a new call wherein participating devices have not yet been identified or have not yet joined the multicast address for the call, or where the call is for an expired context. At step 414, the first site sends a paging message to prospective talkgroup members at its site.

At step 416, the first site sends ("tunnels") payload to the secondary site(s) in its location area. The payload is "tunneled" in the sense that it is (at least initially) sent via the location area multicast address, which is normally a control channel, before the secondary site(s) have joined the payload multicast address. At step 418, the secondary site(s) having joined the location area multicast address receive the tunneled payload. In effect, the tunneling of payload may be considered to be a manner of informing the secondary sites that a talkgroup is active, even without sending a Group Active Event message. If desired, a Group Active Event message may also be sent. The tunneling of payload is advantageous in that it will result in getting payload packets to participating devices faster than the embodiment of FIG. 3, although it requires greater bandwidth utilization.

At step 420, the first site determines if it has received responses to the page(s) sent at step 414. Like the embodiment of FIG. 3, the first site may start a page response timer, whereby page responses must be received within a designated time period to be considered valid. If, at step 420, page responses are received before expiration of the page response timer, the first site identifies the responding devices and delivers the stored payload to the responding devices at step 422. For example, in the case where the responding devices comprise wireless communication units, the first site delivers the stored payload to the communication units via appropriate wireless communication resources at step 422.

If the first site determines (step 428) that the talk group is no longer affiliated with the site, the first site leaves the payload multicast group address at step 426. Otherwise, so long as at least one communication unit affiliated with the talk group remains operational within the site, processing continues at steps 408–422 as described above.

If, at step 420, page responses are not received (or not received in timely fashion), the first site determines that there are no devices at its site that desire to receive payload for the talkgroup, flushes the buffer ("clears stored payload") at step 424 and leaves the payload multicast group address at step 426.

The secondary site(s), after having received tunneled payload at step 418, also perform a paging sequence at their respective sites to determine if there are devices at their site(s) that desire to receive payload for the talkgroup. At step 430, the secondary site(s) "buffer" or store the payload in memory for possible delayed delivery to talkgroup members at their respective sites. At step 432, the secondary site(s) send paging messages to prospective talkgroup members at their sites. At step 434, the secondary site(s) determine whether page responses have been received. As has been described in relation to FIG. 3, the secondary site(s) may start a page response timer, whereby page responses must be received within a designated time period to be considered valid. If, at step 434, page responses are not received (or not received in timely fashion) at any secondary site, that site determines that there are no devices at its site that desire to receive payload for the talkgroup and the site returns to an idle state until such time as the site receives more tunneled payload at step 318.

As will be appreciated, the secondary sites may receive multiple instances of tunneled payload associated with a particular talkgroup call. In the preferred embodiment, secondary site(s) store tunneled payload at step 430, perform the paging sequence of steps 432, 434, deliver the stored tunneled payload at step 436 and join the payload multicast group address at step 438 only upon the first occurrence of receiving tunneled payload for a particular talkgroup. If a secondary site receives any further instances of tunneled payload after a talkgroup is already active at the secondary site (marked active after the site has joined the payload multicast address), the secondary site will not re-accomplish steps 430, 432, 434, 436 but rather will discard the superfluous tunneled payload for the talkgroup.

If, at step 434, a secondary site determines if it has received timely response(s) to the page(s) (hence there is at least one device at its site that desires to receive payload for the talkgroup), it identifies the responding device(s) and delivers the stored tunneled payload to the responding devices at step 436. For example, in the case where the responding devices comprise wireless communication units, the secondary site(s) delivers the stored tunneled payload to the communication units via appropriate wireless communication resources at step 436.

At step 438, the secondary site(s) join the payload multicast group address for the talkgroup. Thereafter, the secondary site(s) are able to receive at step 440 outbound traffic (payload) addressed to the payload multicast address. The secondary site(s) deliver the payload to the responding devices (e.g., communication units) via appropriate wireless communication resources at step 442. The process then returns to an idle state until such time as the site receives more tunneled payload at step 418.

The present invention provides a wireless communication system having a non-hierarchical architecture in which mobility processing is distributed, rather than centralized, and which supports mobility and connection control for multi-cell location areas. The system enables a communication unit to register affiliations and/or location updates only upon entering a new location area to save control channel capacity. The system utilizes paging sequences at various sites to locate communication units desiring to receive payload for a talkgroup without relying on location registers (HLR/VLRs) to determine which communication units should be paged. The network by design is highly scalable. Unlike a centralized connection management approach where the network must be reconfigured as connection elements are added or deleted, the present invention, through the use of join and leave messages, provides for the network to reconfigure itself to route payload packets to all destinations where call participants are attached, update itself constantly, determine new routes and delete old ones. No manual link configuration is required.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. In a location area including a plurality of sites linked together by a packet network, a method comprising:
    determining a location area multicast group address associated with the location area;
    issuing commands to the packet network requesting reconfiguration of the packet network to enable the sites of the location area to receive at least control messages via the location area multicast group address;
    determining a payload multicast group address for a cellular call;
    issuing commands to the packet network requesting reconfiguration of the packet network to enable a first site to receive outbound traffic for the call via the payload multicast group address;
    receiving, by the first site, an outbound message for the call via the payload multicast group address;
    determining one or more participating devices for the call; and
    sending at least a portion of the outbound message to the participating devices.

2. The method of claim 1, wherein the step of issuing commands comprises sending, from each site of the plurality of sites, an IGMP Join message identifying the location area multicast group address to one or more network devices of the packet network.

3. In a location area including a plurality of sites linked together by a packet network, a method comprising:
    determining a location area multicast group address associated with the location area;
    issuing commands to the packet network requesting reconfiguration of the packet network to enable the sites of the location area to receive at least control messages via the location area multicast group address;
    receiving, by a first site of the plurality of sites, an affiliation message for a talkgroup;
    determining a payload multicast group address corresponding to the talk group;
    issuing commands to the packet network requesting reconfiguration of the packet network to enable the first site to receive outbound traffic via the payload multicast group address;
    receiving, by the first site, an outbound message for the talkgroup via the payload multicast group address;
    determining a number of participating devices of the talkgroup; and
    sending at least a portion of the outbound message to the participating devices.

4. The method of claim 3, wherein the step of issuing commands comprises the first site sending an IGMP Join message identifying the payload multicast group address to one or more network devices of the packet network.

5. The method of claim 3, wherein the outbound message is part of an active call for the talkgroup, the step of determining a number of participating devices comprising identifying devices already participating in the active call as participating devices.

6. The method of claim 3, further comprising;
    determining, by the first site, that the talk group is no longer affiliated with the first site; and
    issuing commands to the packet network requesting reconfiguration of the packet network to enable the first site to discontinue receiving outbound traffic via the payload multicast group address.

7. The method of claim 3, wherein the outbound message is not part of an active call for the talkgroup, the step of determining a number of participating devices comprising identifying devices desiring to participate in the talkgroup call as participating devices.

8. The method of claim 7, wherein the step of identifying devices desiring to participate in the talkgroup call comprises:
    sending pages throughout a coverage area of the first site; and
    if page responses are received from one or more responding communication units at the first site, identifying the responding communication units as participating devices.

9. The method of claim 8, further comprising:
    prior to determining a number of participating devices of the talkgroup, storing, by the first site, at least a portion of the message for possible delivery to the participating devices; and
    upon receiving page responses from the responding communication units, thereby defining participating devices, sending the stored payload to the participating devices.

10. The method of claim 9, wherein if page responses are not received from one or more responding communication units at the first site, the method comprises:
    clearing the at least a portion of the message stored by the first site; and
    issuing commands to the packet network requesting reconfiguration of the packet network to enable the first site to discontinue receiving outbound traffic via the payload multicast group address.

11. The method of claim 7, wherein the step of identifying devices desiring to participate in the active call comprises:
    sending, from the first site to the packet network, a message addressed to the location area multicast group address including indicia of the talkgroup call;
    receiving, by at least a second site of the plurality of sites having joined the location area multicast group address, the message including indicia of the talkgroup call;
    sending pages throughout a coverage area of the second site; and
    if page responses are received from one or more responding communication units at the second site, identifying the responding communication units as participating devices.

12. The method of claim 11, wherein if page responses are received from the responding communication units at the second site, thereby defining participating devices, the method comprises:
    issuing commands to the packet network requesting reconfiguration of the packet network to enable the second site to receive outbound traffic via the payload multicast group address; and receiving, by the second site, outbound messages for the talkgroup via the payload multicast group address.

13. The method of claim 7, wherein the step of identifying devices desiring to participate in the active call comprises:

tunneling, from the first site to the packet network, at least a portion of the outbound traffic for the talkgroup via the location area multicast group address;

receiving, by at least a second site of the plurality of sites having joined the location area multicast group address, the at least a portion of the outbound traffic for the talkgroup;

sending pages throughout a coverage area of the second site; and if page responses are received from one or more responding communication units at the second site, identifying the responding communication units as participating devices.

14. The method of claim 13, wherein if page responses are received from the responding communication units at the second site, thereby defining participating devices, the method comprises:

issuing commands to the packet network requesting reconfiguration of the packet network to enable the second site to receive outbound traffic via the payload multicast group address; and receiving, by the second site, outbound messages for the talkgroup via the payload multicast group address.

15. The method of claim 13, further comprising:

prior to determining a number of participating devices of the talkgroup at the second site, storing, by the second site, at least a portion of the outbound traffic for possible delivery to the participating devices; and upon receiving page responses from the responding communication units, thereby defining participating devices, sending the stored payload to the participating devices.

16. The method of claim 3, wherein the step of issuing commands comprises sending, from each site of the plurality of sites, an IGMP Join message identifying the location area multicast group address to one or more network devices of the packet network.

* * * * *